Aug. 13, 1929.  F. BERDOLT  1,724,122
REFRIGERATING APPARATUS
Filed Sept. 10, 1923
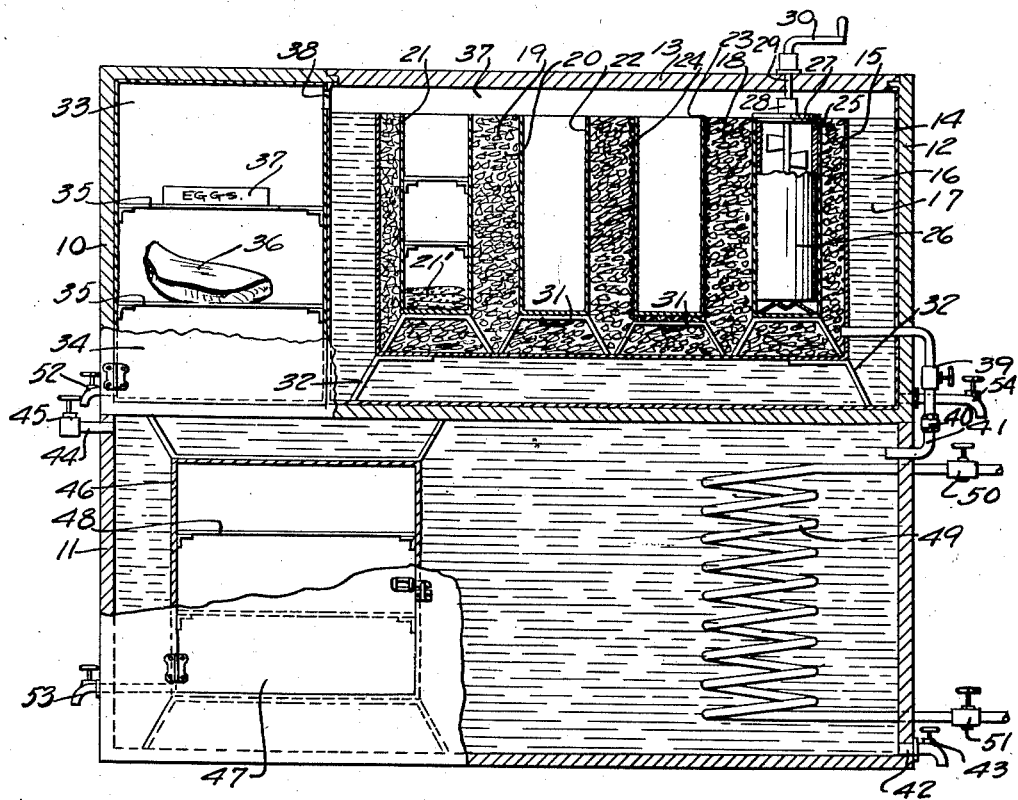
INVENTOR
Frank Berdolt
BY
ATTORNEY Patented Aug. 13, 1929.

1,724,122

UNITED STATES PATENT OFFICE.

FRANK BERDOLT, OF COXSACKIE, NEW YORK, ASSIGNOR OF ONE-HALF TO M. E. BERDOLT, OF ALBANY, NEW YORK.

REFRIGERATING APPARATUS.

Application filed September 10, 1923. Serial No. 661,745.

This invention relates to refrigerating apparatus and the like and more particularly to such apparatus making use of a freezing mixture, such, for example, as cracked or broken ice and salt or brine.

One feature of the invention consists in surrounding the freezing mixture with a layer of water, which being frozen into ice by the freezing mixture serves as an added insulating means, and also serves, so to speak, as a storage reservoir for cold, which is useful to reduce the amount and especially the frequency of attention which must be given to the apparatus, since before the temperature can rise unduly it is necessary for this insulating layer of ice to be melted.

Another feature consists in the provision of a variety of receptacles within the freezing mixture chamber, which may be utilized for reception of contents desired to be frozen, including edible materials, such as fish and the like, products such as ice cream. When any of said receptacles are empty and not being used for any other purpose, they may be filled with water which may be frozen into ice and said ice used to renew, at least in part, the supply of ice for the freezing mixture.

I also provide a storage compartment or storage compartments adjacent to the freezing mixture chamber, and in air communication therewith for purposes such as made use of in the ordinary refrigerator in common use, that is to keep food and the like products cold without subjecting them to actual freezing.

The waste brine may also be used in accordance with my invention to keep similar compartments at a low temperature, and to chill fluids, such as drinking water, soda water and the like.

Other features will appear in my specification and claim.

The accompanying drawings show a cross-section of a preferred form of refrigerator apparatus.

Reference character 10 indicates a refrigerating device, here shown in substantially the form of a chest. 11 is the waste brine tank, which may be dispensed with in case the brine is run to waste without utilization of its low temperature for chilling purposes. As shown the refrigerating device 10 is supported on the brine tank, so that the brine may be run therein by gravity.

The outer wall 12 and lid 13 of chest 10 is constructed of or provided with any suitable heat insulating material, which may be of any desired thickness. A water tight compartment 14 is provided within the insulating walls 12, as for example, same may be made as a metal tank open at the top.

Within tank 14 and spaced from its walls is the inner tank 15 leaving a space 16 intermediate of the walls of the tanks 14 and 15. Such space 16 is filled with water, which is adapted to be frozen into ice and same is indicated by reference numeral 17.

Tank 15 is for reception of the freezing mixture 18, which may be of any desired freezing components and is preferably of ice and salt or brine mixture, the pieces of ice being indicated by reference character 19, and the fluid content by reference character 20. Within the freezing mixture tank are receptacles preferably cans for reception of anything which is desired to be frozen or kept in frozen condition, as, for example, can 21 may be used for storage of fish 21' or other food material best kept in frozen state until used. Can 22 may be filled with water to be frozen into a block of ice. At 23 is indicated a wire cage adapted to receive a removable canister 24, which may contain water, etc., to be frozen into ice, etc., and removed with the canister 24. At 25 is shown an open metal framework adapted to receive and support for rotation therein the ice cream can 26 having a cover 27 with a preferably square socket 28 to receive the similarly shaped shaft 29 of crank 30, which is journaled in the cover 13 and adapted to be engaged or disengaged when the cover is closed or opened. Of course, when it is not desired to use same the ice cream freezer can 26 may be taken out and the space used for other purposes, as for receiving a canister such as the canister 24, thus dispensing with any handle engagement in closing the lid 13.

The containers 21, etc., are suitably supported in any desired way in the tank 15, as on legs 31. Legs 32 may be provided for tank 15 in tank 14.

The tanks 14 and 15 may extend substantially throughout the length of chest 10 if desired, but preferably same are so proportioned as to leave a space or compartment 33 having a side door 34 and provided with shelves 35 to receive food or like articles, which are desirably kept cold, but not frozen. A ham 36 and a box of eggs 37 are indicated in the drawing as stored in compartment 33. Compartment 33 is in air communication with the freezing mixture compartment 37, as, for example, by means of the open space left at 38 between compartments 33 and 37. Cold air passing through the opening 38 from over the freezing mixture sinks toward the bottom of compartment 37 and keeps same chilled in a manner which will be readily understood.

When the apparatus described is used alone it may be supported in any desired way. This is also the case when the brine is to be used for chilling purposes, instead of being run to waste cold. In the latter case, however, the chest 10 is preferably supported on a brine tank 11, and in such case the bottom of chest 10 may serve as the lid for the brine tank 11 and the brine may be run therein from time to time as by opening the cock 39, which communicates through the removable coupling 40 with the intake pipe 41 of brine tank 11. Brine tank 11 has the outflow pipe 42 at the bottom controlled by cock 43 and may be air vented in any desired way as by vent pipe 44 controlled by cock 45.

The waste brine tank 11, which receives the brine 20 from tank 15, is provided with means for chilling any desired materials, as, for example, it may contain a compartment 46 partially or completely surrounded by brine and having a side door 47 extending through that part of tank 11 to give access to the storage space, as on shelves 48, whereon food products or the like may be stored and/or it may contain the coil 49 to chill drinking water, soda water or other fluid, the inlet and outlet whereof are controlled by cocks 50 and 51 respectively, and other arrangements may obviously be resorted to for utilizing the chilling effect of the brine before finally discharging same from the apparatus.

The embodiment of the invention illustrated is intended to illustrate the principles of the invention in a simple way, and it will readily be understood that same is for illustration only and for affording an understanding of a simple embodiment of the invention and not for limitation of the invention. Changes and modifications may be resorted to within the scope of my invention, without departing from the principle or sacrificing the advantages of my invention.

The storage compartments may be provided with drip valves 52 and 53 to permit any condensed or other accumulated water to be discharged and the water compartment 16 may have a valved outlet or draw-off pipe 54, if desired.

I claim:

In a refrigerating apparatus, a brine tank open at the top, a housing open at the top and resting upon and forming a closure for the brine tank, said housing being adapted to contain water, a second housing open at the top and within and spaced apart vertically and horizontally from said first housing, said second housing being adapted to contain a freezing mixture, a third housing open at the top and within and spaced apart vertically and horizontally from said second housing, said third housing being impermeable to the freezing mixture of the second housing, and means for closing the top of said first housing, and a drain from the lower part of the second housing to said brine tank.

In testimony whereof, I have signed my name hereto.

FRANK BERDOLT.